US007878615B2

(12) United States Patent
Reichelsheimer et al.

(10) Patent No.: US 7,878,615 B2
(45) Date of Patent: Feb. 1, 2011

(54) SYSTEM AND METHOD FOR DETECTING DEFECTIVE INK JET NOZZLES

(75) Inventors: Jay Reichelsheimer, Shelton, CT (US); David B. Wilk, Clinton, CT (US); George M. Macdonald, New Canaan, CT (US)

(73) Assignee: Pitney Bowes Inc., Stamford, CT (US)

( * ) Notice: Subject to any disclaimer, the term of this patent is extended or adjusted under 35 U.S.C. 154(b) by 288 days.

(21) Appl. No.: 11/303,079

(22) Filed: Dec. 14, 2005

(65) Prior Publication Data

US 2007/0132801 A1 Jun. 14, 2007

(51) Int. Cl.

| | |
|---|---|
| ***B41J 29/393*** | (2006.01) |
| ***B41J 29/38*** | (2006.01) |
| ***B41J 2/01*** | (2006.01) |
| ***G06F 17/00*** | (2006.01) |
| ***G06K 9/00*** | (2006.01) |
| ***B42D 15/00*** | (2006.01) |

(52) U.S. Cl. ............................ 347/19; 347/5; 347/105; 705/401; 382/101; 283/91

(58) Field of Classification Search .................. 347/19, 347/2, 95, 96, 100, 101, 105, 106, 107; 705/60, 705/401, 62, 418; 364/464.02; 235/462.01, 235/468; 250/271; 382/101; 283/73, 81, 283/88, 89, 87, 91, 92, 114

See application file for complete search history.

(56) References Cited

U.S. PATENT DOCUMENTS 3,614,430 A * 10/1971 Berler ........................ 250/271
4,716,456 A 12/1987 Hosaka ........................ 358/75
5,569,317 A * 10/1996 Sarada et al. ............... 524/111
5,861,618 A * 1/1999 Berson ....................... 235/468
5,971,276 A * 10/1999 Sano et al. ............. 235/462.01
6,039,257 A 3/2000 Berson et al. ............... 235/468
6,303,929 B1 10/2001 Oshima et al. .............. 250/271
6,378,976 B1 * 4/2002 Byers et al. ................... 347/19
6,459,858 B1 * 10/2002 Davis ........................... 399/2
6,561,612 B2 5/2003 Minckler ..................... 347/19
6,766,953 B1 * 7/2004 Huston et al. .......... 235/462.05

(Continued)

FOREIGN PATENT DOCUMENTS

EP 0219847 A2 10/1986

(Continued)

*Primary Examiner*—Stephen D Meier
*Assistant Examiner*—Rene Garcia, Jr.
(74) *Attorney, Agent, or Firm*—George M. Macdonald; Angelo N. Chaclas

(57) ABSTRACT

A system for detecting failures in a sensitive region of an inkjet printhead is described. The system includes an inkjet printer that uses a printhead for printing an image on a substrate. The image has a sensitive portion that is more sensitive to printing failures than the rest of the image. The printhead includes a first portion that prints an area of the substrate corresponding to the sensitive portion of the image. A radiant energy source is used with a photodetector located downstream from the printhead to detect background florescence from the substrate in the area of the substrate corresponding to the sensitive portion of the image that should be quenched by printing of the image. If background fluorescence is detected, a failure is indicated.

18 Claims, 5 Drawing Sheets

U.S. PATENT DOCUMENTS

| | | | | |
|---|---|---|---|---|
| 6,827,769 | B2 | 12/2004 | Auslander et al. | 106/31.32 |
| 6,877,427 | B2 | 4/2005 | Dunninger et al. | |
| 6,958,482 | B2 * | 10/2005 | Martinez et al. | 250/461.1 |
| 7,086,714 | B2 * | 8/2006 | Endo | 347/16 |
| 7,422,158 | B2 * | 9/2008 | Auslander et al. | 235/491 |
| 7,438,378 | B2 * | 10/2008 | Reichelsheimer et al. | 347/19 |
| 2002/0002410 | A1 | 1/2002 | Tomita et al. | 700/67 |
| 2005/0248606 | A1 * | 11/2005 | Hoshiyama et al. | 347/19 |
| 2006/0044341 | A1 | 3/2006 | Reichelsheimer et al. | 347/19 |
| 2006/0158472 | A1 * | 7/2006 | Endo | 347/14 |
| 2006/0196950 | A1 * | 9/2006 | Kiliccote | 235/494 |

FOREIGN PATENT DOCUMENTS

| | | | |
|---|---|---|---|
| EP | 0714777 | A1 | 11/1995 |
| EP | 08643012 | A | 3/1998 |
| JP | 2001/113771 | | 4/2001 |
| WO | 01/17784 | A1 | 3/2001 |
| WO | 01/21405 | A2 | 3/2001 |

* cited by examiner

G-154

SYSTEM AND METHOD FOR DETECTING DEFECTIVE INK JET NOZZLES

BACKGROUND OF THE INVENTION

1. Field of the Invention

The present invention relates to detecting defective printing systems and, more particularly in certain embodiments, to detecting defective ink jet nozzles in a postage indicia printing system.

2. Brief Description of Background

Currently there is no way for a postage meter to determine if a particular ink jet nozzle or group of nozzles is failing in a postage meter using ink jet printing technology. Certain postal systems require that postage indicia include a two-dimensional barcode for encoding postage indicia information that may then be read and decoded by automated postal processing equipment. Accordingly, many postage meters print postage indicia using linear ink jet arrays of a particular width such as one inch. Furthermore, postal systems are increasingly using two-dimensional barcodes to transmit additional data such as information relating to value added services stored in a second barcode. Therefore, it is becoming more important in the mailing industry that barcodes be readable to a high degree of accuracy because the postal systems are using them with value added services and revenue protection schemes.

Two-dimensional bar codes utilize a defined encoding format having certain known absolute or relative physical formatting rules and symbologies so that bar code readers can read the bar code so that the embedded information may be decoded. There are many standard Two-dimensional bar codes formats including the DATAMATRIX bar code that have some error checking and redundancy, but may also have regions that are more vulnerable to failure. For example, the DATAMATRIX bar code format includes an “L finder” region and a “timing pattern” region that may be more sensitive to failures than data regions of the bar code. A single damaged or missing ink-jet nozzle that is located in an area that prints a sensitive region such as the “timing pattern” region may disproportionately negatively affect the accurate readability of the postage meter. Accordingly, the printed indicia might not be readable and may result in a loss of postage funds or other negative consequence such as late delivery of the mail.

Certain high-speed mailing machines with postage meters such as the TURBOJET available from Pitney Bowes Inc. of Stamford Conn. print postage indicia at a relatively high rate of speed. If there is an ink-jet nozzle failure in a critical location, it is possible that $50,000 worth of postage could be lost per hour. It is possible to create an ink-jet postage meter indicia error detection system that reads the entire bar code, decodes the information and then compares the read information with the expected written information to determine if there has been a printing failure. However, such a system would scan an image of the full bar code or mailpiece to determine if there is a defect in the printed image. Such a system would require relatively significant computing power and expensive imaging and decoding software/hardware.

Accordingly, there is a need for a relatively inexpensive and fast ink-jet nozzle failure detection system. Furthermore, there is a need for a relatively inexpensive and fast ink-jet nozzle failure detection system for detecting failed nozzles in a sensitive region of the ink-jet nozzle array.

SUMMARY OF THE INVENTION

In accordance with one illustrative embodiment of the present application, a system for detecting failures in a sensitive region of an inkjet printhead is described. The system includes an inkjet printer that uses a printhead for printing an image on a substrate. The image has a sensitive portion that is more sensitive to printing failures than the rest of the image. The printhead includes a first portion that prints an area of the substrate corresponding to the sensitive portion of the image. A radiant energy source is used with a photodetector located downstream from the printhead to detect background fluorescence from the substrate in the area of the substrate corresponding to the sensitive portion of the image that should be quenched by printing of the image. If background fluorescence is detected, a failure is indicated.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Mailing machines including ink-jet based printing postage meters for printing postage indicia such as the DM series of mailing machines are available from Pitney Bowes Inc. of Stamford, Conn. Commonly owned, co-pending patent application Ser. No. 10/929,170, entitled Fluorescent Ink Detector, filed Aug. 30, 2004 is incorporated herein by reference.

Figure 1:
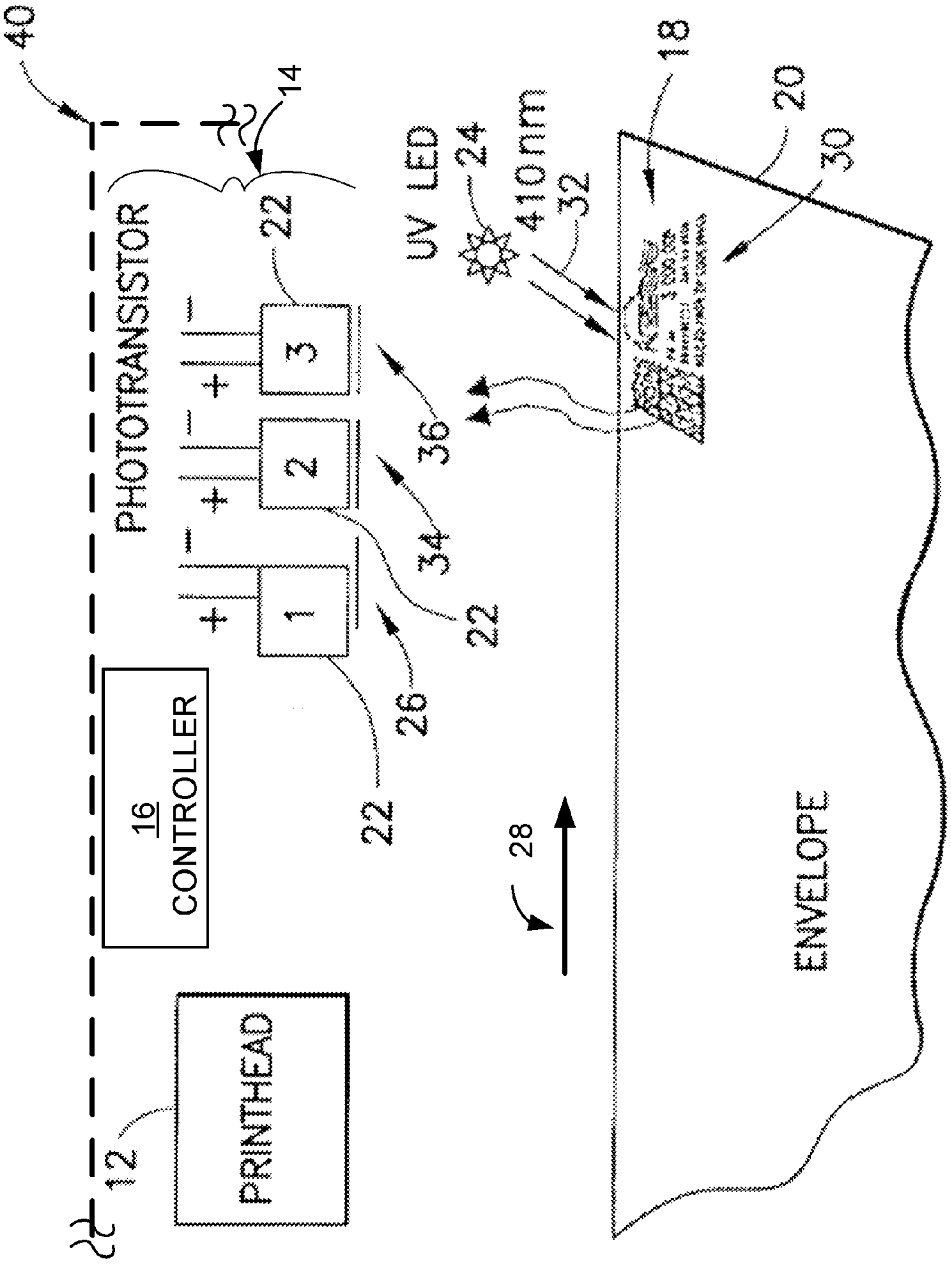
FIG. 1 is a diagram showing some components of a postage meter incorporating features of the present invention and an envelope that has been franked by the postage meter according to an illustrative embodiment of the present application.

Referring to FIG. 1, there is shown a diagram of some components of a modified DM1000 postage meter 40 incorporating features of the present invention. In the application incorporated above, a system is described for detecting fluorescent inks. Here, the detection system will function with conventional inks with appropriate contrast from the substrate such as greater than fifty percent contrast. Although the present invention will be described with reference to the exemplary embodiments shown in the drawings, it should be understood that the present invention can be embodied in many alternate forms of embodiments. In addition, any suitable size, shape or type of elements or materials could be used.

The postage meter 40 generally comprises a print head 12, a defective ink-jet nozzle detector 14 including several phototransistors 22 and optionally filters 26, 34, 36. The postage meter 40 also includes a controller 16 and preferably comprises other features such as a display, an input device, and a data communications device (such as a modem), not shown. Although the present invention is being described with reference to use in a postage meter, features of the present invention could be used in any suitable type of printing device for detecting defective ink-jet nozzles in a region of interest. Most envelopes contain natural fluorescent optical brighteners. If a postal indicium is printed with a conventional ink-jet ink, the ink quenches the fluorescence from the envelope where it is printed. Accordingly, it has been determined that a UV LED and phototransistor detection system can utilize the contrast caused by the quenching effect to detect defective ink-jet nozzles. The improved mailing machine monitors for defective ink-jet nozzles as indicia are being printed so that the operator or mailing machine can take action to fix any problem immediately.

The print head 12 is adapted to print a postage indicium 18 on an article 20, such as an envelope or an adhesive paper strip. The print head 12 uses an ink jet printing method. The ink used to print the indicium 18 preferably comprises conventional black ink. For example, systems described in the application referenced above utilize similar sensors to detect a specific ink type, such as those having special features such as fluorescence. However, the embodiments described herein will successfully detect damaged ink-jet nozzles using any ink having a suitable contrast from the substrate such as a contrast greater than fifty percent. Alternatively, fluorescent ink such as described in the above referenced application may be utilized. Furthermore, luminescent ink may be utilized.

The sensor 14 is located downstream from the print head 12. In other words, as the article 20 moves in direction 28, the indicium 18 is printed by the print head and then moves along a paper path to sensing location 30 in the vicinity of sensor 14. The sensor 14 generally comprises several photodetectors 22 and a radiant energy source or excitation source 24. The photodetectors 22 generally comprise a phototransistor. However, any suitable type of photodetector could be used. The radiant energy source 24 generally comprises an ultraviolet (UV) light emitting diode (LED). The LED comprises a 410 nm LED. However, any suitable type of radiant energy source could be used. Optionally, the sensor 14 also comprises filters. Any suitable filter could be provided whether it be a physical filter or a coating on the optical lens.

In this embodiment, an ultraviolet light emitting diode (UV-LED) 24 and a light-to-voltage sensor 22 is utilized. The UV-LED provides 410 nm light energy to the printed indicia. There are additives present in most papers and envelopes that fluoresce blue when excited by UV light. In the printed area, the dye or pigment of the ink absorbs the UV light and that area remains dark. Accordingly, the system can detect missing jets by detecting blue fluorescence from the mailpiece in a location that should have been quenched by the indicia. In one alternative, each row of the indicia can be assumed to contain some ink. Accordingly, the system can detect fluorescence as the mailpiece moves under the detector to ensure that the blue fluorescence is quenched by one or more pixels were printed in that row.

If red fluorescent ink is being used, the sensor can be filtered to detect only the blue fluorescence from the unquenched substrate locations.

Figure 2:
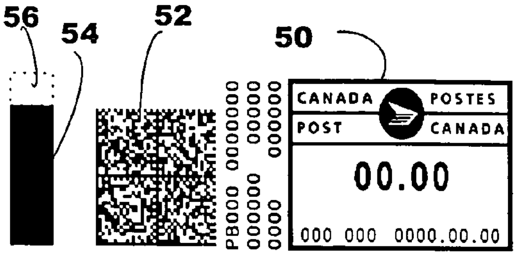
FIG. 2 is a top view of an alternative indicium having an error-detecting strip according to another illustrative embodiment of the present application.

Referring to FIG. 2, a top view of an alternative indicium having an error-detecting strip according to another illustrative embodiment of the present application is shown. In this example, the indicium 50 includes a barcode 52 that does not utilize the entire width of the print head. Accordingly, a sensitive region of the print head array may be defined as that portion of the array that prints the barcode 52. Accordingly, a test strip 54 comprises several columns of ink pixels along the width of the ink-jet printhead array that covers the width used for only the barcode 52. A blank area 56 is used outside of the sensitive area and the detectors are not positioned to detect fluorescence in the non-sensitive area 56.

The printed solid line corresponding to the sensitive areas of the DATAMATRIX barcode will absorb a known amount of UV light and the sensor will output a constant lower value compared to a non-printed area (i.e. 2V compared to 4V). If any ink-jet nozzles fail during the operation of the machine, the white space over the fixed area will become larger and the signal will increase. This increase in signal will show that the print has changed and the machine can go into a maintenance mode. In another alternative, the sensitive area may be defined as a smaller area such as the row that prints the timing patterns.

Figure 3:
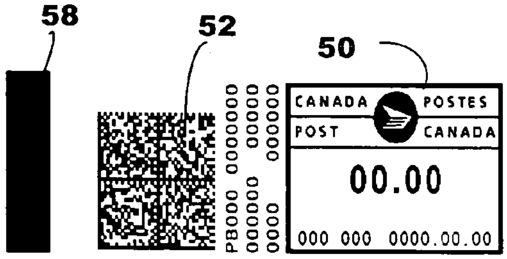
FIG. 3 is a top view of another alternative indicium having an error-detecting strip according to another illustrative embodiment of the present application.

Referring to FIG. 3, a top view of another alternative indicium having an error-detecting strip according to another illustrative embodiment of the present application is shown. In this example, the test strip 58 comprises several columns of ink pixels along the entire width of the ink-jet printhead array that covers the width used for both the barcode 52 and the entire indicium 50.

Referring to FIGS. 4-9, a series of three experiments is described using a normally operating mailing machine and two failing ink-jet heads respectively.

Figure 4:
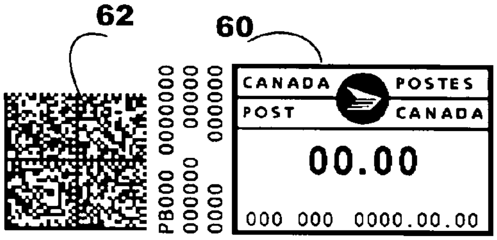
FIG. 4 is a top view of an indicium printed without defects to illustrate the operation of the system of FIG. 1.
Figure 5:
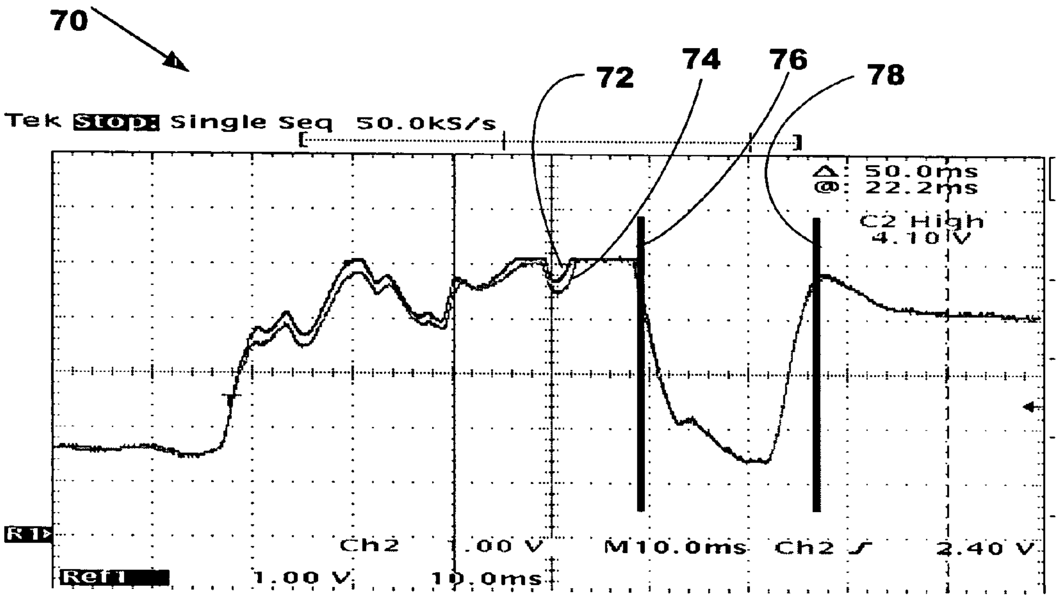
FIG. 5 is a diagram showing the detector output of the system of FIG. 1 in response to the indicium of FIG. 4.

FIG. 4 shows a top view of an indicium 60 including a barcode 62 printed without defects to illustrate the operation of the system of FIG. 1. FIG. 5 shows a diagram 70 showing the detector output of the system of FIG. 1 in response to the indicium 60 of FIG. 4. In this example, the indicia 60 was printed on an HP Laserjet printer on white copier paper. The indicia 60 was taped to the right corner of an envelope in the exact placement of printed indicia. The envelope was then processed through a mailing machine in a Seal Only mode so that the image would pass under the sensor. The process resulted in waveforms shown in diagram 70 that is representative of the particular style of indicia used. If the postage amount and barcode content changed slightly, the waveform would change, but the distinctions of the two curves during a failure mode would still be present. In this example, the printing subsystem is operating normally and the waveforms 72, 74 track through the region of interest bound by markers 76, 78 that represent the area associated with the DATAMATRIX barcode. The experiment was repeated several times to ensure repeatable results.

Figure 6:
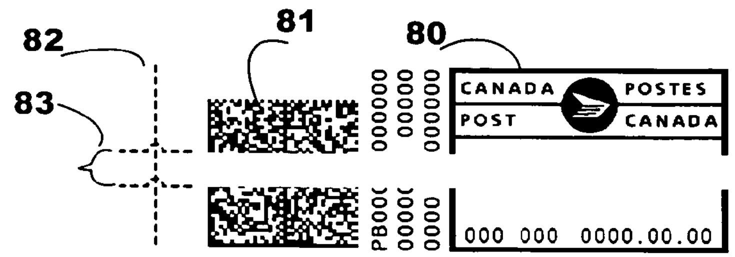
FIG. 6 is a top view of an indicium printed with defects to illustrate the operation of the system of FIG. 1.
Figure 7:
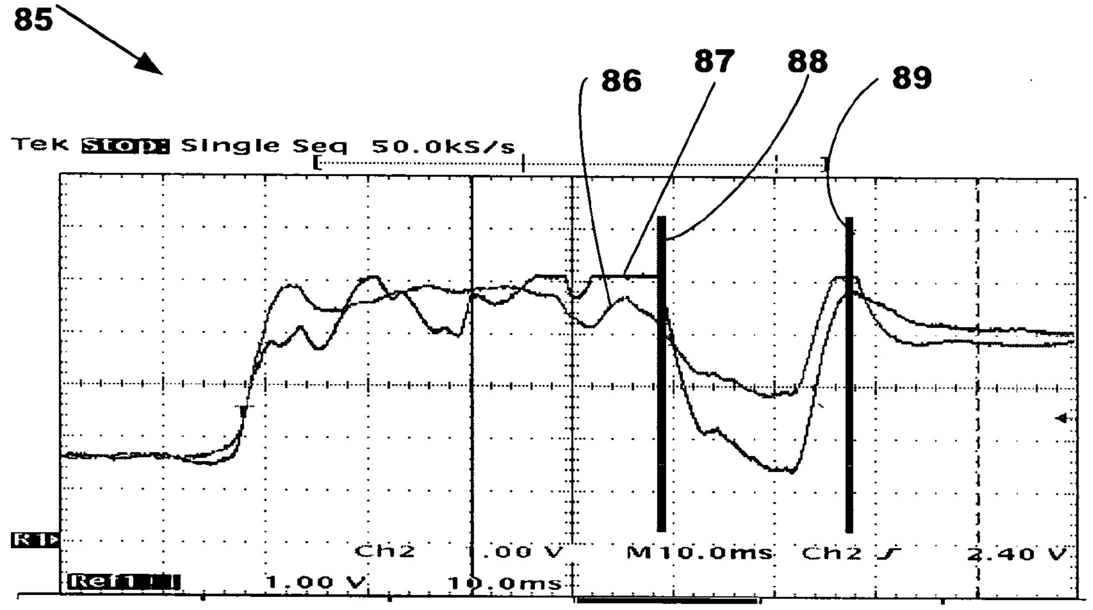
FIG. 7 is a diagram showing the detector output of the system of FIG. 1 in response to the indicium of FIG. 6.

FIG. 6 shows a top view of an indicium 80 including a barcode 81 printed with defects in the printhead 82 shown in the gap 83 to illustrate the operation of the system of FIG. 1. FIG. 7 shows a diagram 85 showing the detector output of the system of FIG. 1 in response to the indicium 80 of FIG. 6. In this example, ink-jet nozzle failure was simulated by digitally removing horizontal lines from the image 80,81 in the region 83. The images were printed and run in the same manner as described above. The two waveforms 86, 87 shown in diagram 85 show the detectable response changes from the baseline. This example consisted of removing a relatively large number of nozzles to create a relatively large blank area 83. In this example, the printing subsystem is operating in a significant failure mode including a significant failure in the region of interest or sensitive area. The waveforms 86, 87 track through the region of interest bound by markers 88, 89 that represent the area associated with the DATAMATRIX barcode and in that region there is a wide discrepancy between the waveforms that can be detected to indicate a failure of the ink-jet nozzles in a sensitive region.

Figure 8:
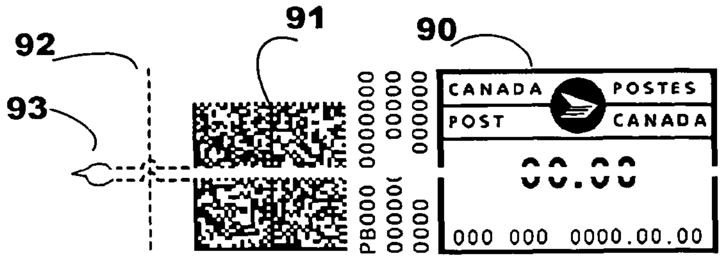
FIG. 8 is a top view of another indicium printed with defects to illustrate the operation of the system of FIG. 1.
Figure 9:
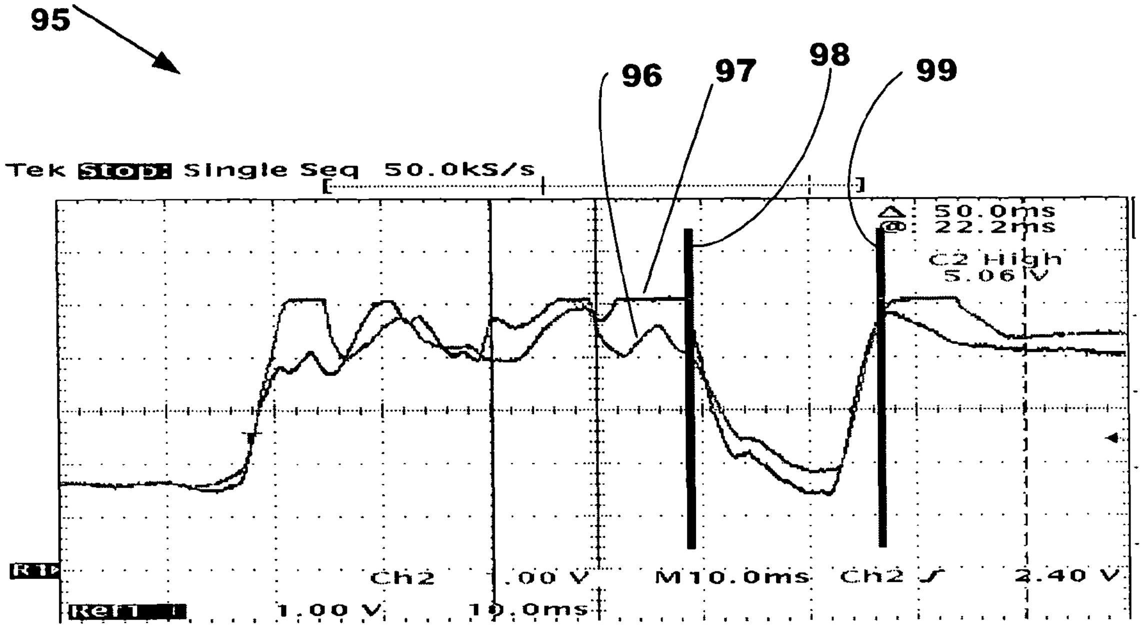
FIG. 9 is a diagram showing the detector output of the system of FIG. 1 in response to the indicium of FIG. 8.

FIG. 8 shows a top view of an indicium 90 including a barcode 91 printed with defects in the printhead 92 shown in the gap 93 to illustrate the operation of the system of FIG. 1. FIG. 9 shows a diagram 95 showing the detector output of the system of FIG. 1 in response to the indicium 90 of FIG. 8. In this example, ink-jet nozzle failure was simulated by digitally removing horizontal lines from the image 90,91 in the relatively small, but sensitive region 93. The images were printed and run in the same manner as described above. The two waveforms 96, 97 shown in diagram 95 show the detectable response changes from the baseline. This example consisted of removing a relatively small number of nozzles to create a relatively small blank area 93. However, this blank area corresponds to the relatively sensitive timing pattern of the barcode. In this example, the printing subsystem is operating in a somewhat significant failure mode including a significant failure in the region of interest or sensitive area. The waveforms 96, 97 track through the region of interest bound by markers 98, 99 that represent the area associated with the DATAMATRIX barcode and in that region there is a sufficiently wide discrepancy between the waveforms that can be detected to indicate a failure of the ink-jet nozzles in a very sensitive region.

Figure 10:
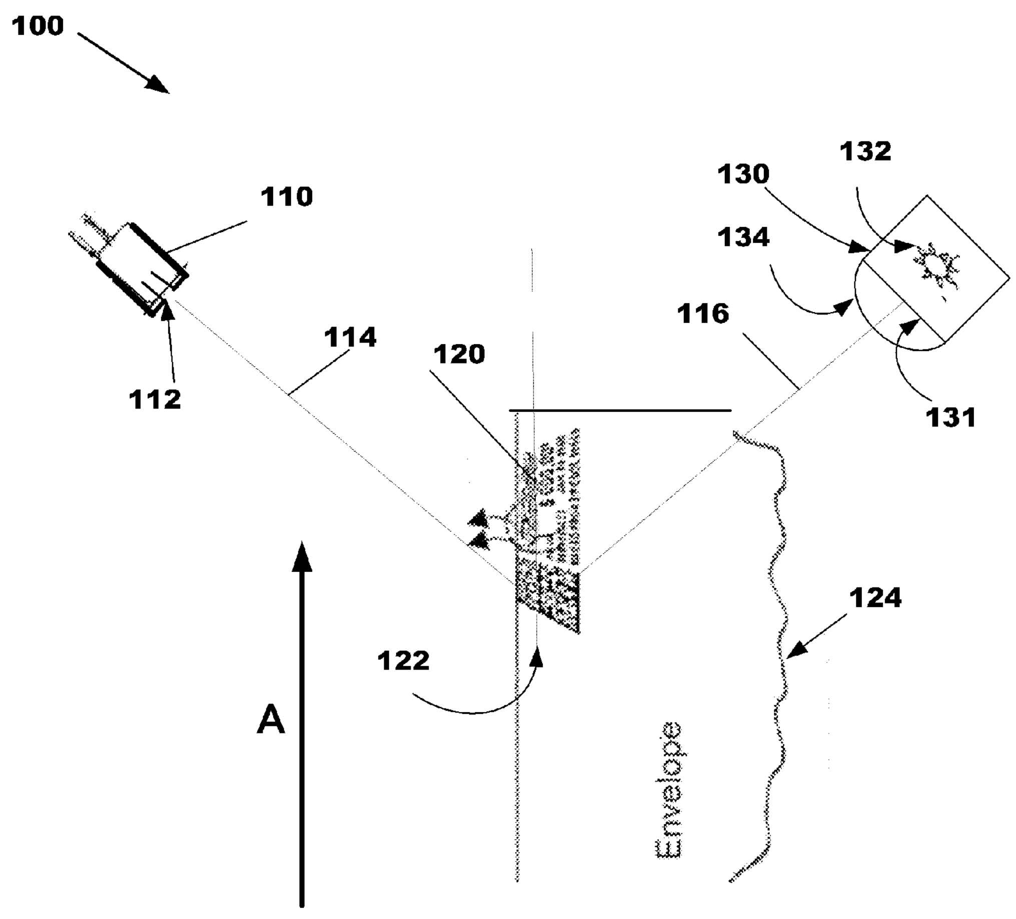
FIG. 10 is a diagram showing some components of a postage meter incorporating features of the present invention and an envelope that has been franked by the postage meter according to an alternative illustrative embodiment of the present application.

Referring to FIG. 10, a diagram showing some components of a postage meter 100 incorporating features of the present invention and an envelope that has been franked by the postage meter according to an alternative illustrative embodiment of the present application is shown. The envelope 124 travels through the feed path of the postage meter along direction A and the indicium 120 is printed by the postage meter 100. The indicium 120 has a sensitive region 122 that corresponds to several inkjet nozzles that print the timing pattern of the bar code. The bar code includes redundancy and error correction in the data sections of the bar code that enable some recovery from print failures, but the bar code is more sensitive to errors in the timing code portion such that the bar code might not be readable if there is a print error in those related inkjet nozzles. Here, the UV light source LED 132 is in an opaque housing 130 with a transparent end attached to a convex lens 134. Accordingly, the UV light radiates only through the lens 134 and is focused on the area of the envelope 124 consisting of the sensitive portion 122 of the indicium 120. The focused UV light beam 116 strikes the indicium at 122 and is reflected along 114 into a target window 112 of photodetector 110. Accordingly, the system is able to provide good selectivity of the area under test and provide an indication of whether it is likely that there is a print head malfunction in a sensitive area of the print head that corresponds to a sensitive area of the bar code.

A low cost system incorporating less than $10.00 of detector parts is used to determine if there is an ink-jet failure in a sensitive region of the ink-jet head. In an alternative embodiment, narrow bandpass filters of 400 nm, 500 nm and 620 nm are used to obtain the fluorescent intensity at that wavelength. However, in alternate embodiments more or less than three filters and light-to-voltage sensors could be used. In addition, the filters could have any suitable bandpass as is appropriate for the substrates and inks used by the system.

Such sensor systems are not limited to mailing machine use. They can be used with sorters so that a mailpiece that does not meet print quality specifications can be diverted and examined. Additionally, such systems can be used in non-mailing applications anywhere real time print quality needs to be assessed. It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An inkjet printhead failure detector system comprising:

an inkjet printer including a printhead for printing an image on a substrate, wherein the image has a first sensitive portion and the printhead includes a first portion that prints an area of the substrate corresponding to the sensitive portion of the image;

a radiant energy source adapted to radiate electromagnetic energy at a first wavelength;

a photodetector located downstream from a printhead of the printer corresponding to the location of a first portion of the printhead, wherein the photodetector is adapted to detect background fluorescence from the substrate at a second wavelength that differs from the first wavelength in the area of the substrate corresponding to the sensitive portion of the image; and a control system connected to the photodetector for determining if fluorescence is radiating from area of the substrate corresponding to the first sensitive portion of the image to indicate that expected quenching did not occur and to indicate an expected failure of the printhead in the first portion of the printhead, and wherein the first sensitive portion of the image is a less than whole portion of the image and the first sensitive portion is required for readability of the image.

2. The system of claim 1 wherein the radiant energy source comprises an ultraviolet (UV) light emitting diode (LED) operating at the first wavelength of approximately 410 nm and wherein the photodetector comprises a light-to-voltage sensor configured to detect background fluorescence at the second wavelength approximately corresponding to blue light.

3. The system of claim 2 wherein the photodetector comprises a wavelength filter adapted to filter out wavelengths corresponding to approximately red light.

4. The system of claim 3 wherein the wavelength filter comprises a bandpass filter corresponding to the background fluorescence at the second wavelength approximately corresponding to blue light.

5. The system of claim 1 wherein the photodetector comprises a plurality of photosensors, wherein at least two of the photosensors are adapted to detect different wavelengths.

6. The system of claim 1 wherein the radiant energy source comprises an ultraviolet (UV) light emitting diode (LED) in an opaque housing having a transparent portion for emitting UV light and a convex lens for focusing the UV light on the sensitive portion of the indicium.

7. The system of claim 6 wherein the photodetector includes a detection window oriented substantially toward the reflection of UV light from the sensitive portion of the indicium.

8. The system of claim 7 wherein the sensitive portion of the indicium consists of a timing pattern portion of the indicium.

9. The inkjet printhead failure detector system of claim 1 wherein the first sensitive portion of the image consists of a finder pattern of a barcode included in the image.

10. A postage meter system including an inkjet printhead failure detector comprising:

an inkjet printer including a printhead for printing a postage indicium on a substrate, wherein the postage indicium has a first sensitive portion and the printhead includes a first portion that prints an area of the substrate corresponding to the sensitive portion of the postage indicium;

a radiant energy source adapted to radiate electromagnetic energy at a first wavelength;

a photodetector located downstream from a printhead of the printer corresponding to the location of a first portion of the printhead, wherein the photodetector is adapted to detect background fluorescence from the substrate at a second wavelength that differs from the first wavelength in the area of the substrate corresponding to the first sensitive portion of the postage indicium; and a control system connected to the photodetector for determining if fluorescence is radiating from area of the substrate corresponding to the sensitive portion of the postage indicium to determine that expected quenching did not occur and to indicate an expected failure of the printhead in the first portion of the printhead by disabling the postage meter, and wherein the first sensitive portion of the postage indicium is a less than whole portion of the postage indicium and the first sensitive portion is required for readability of the indicium.

11. The system of claim 10 wherein the radiant energy source comprises an ultraviolet (UV) light emitting diode (LED)) operating at the first wavelength of approximately 410 nm and wherein the photodetector comprises a light-to-voltage sensor configured to detect background fluorescence at the second wavelength approximately corresponding to blue light.

12. The system of claim 11 wherein the photodetector comprises a wavelength filter adapted to filter out wavelengths corresponding to approximately red light.

13. The system of claim 12 wherein the wavelength filter comprises a bandpass filter corresponding to the background fluorescence at the second wavelength approximately corresponding to blue light.

14. The system of claim 10 wherein the photodetector comprises a plurality of photosensors, wherein at least two of the photosensors are adapted to detect different wavelengths.

15. The postage meter system of claim 10 wherein the radiant energy source comprises an ultraviolet (UV) light emitting diode (LED) in an opaque housing having a transparent portion for emitting UV light and a convex lens for focusing the UV light on the sensitive portion of the indicium.

16. The postage meter system of claim 15 wherein the photodetector includes a detection window oriented substantially toward the reflection of UV light from the sensitive portion of the indicium.

17. The postage meter system of claim 16 wherein the sensitive portion of the indicium consists of a timing pattern portion of the indicium.

18. The postage meter system of claim 10 wherein the first sensitive portion of the postage indicium consists of a finder pattern of a barcode included in the postage indicium.

* * * * *